(12) United States Patent
von Holst et al.

(10) Patent No.: US 6,520,568 B2
(45) Date of Patent: Feb. 18, 2003

(54) ARRANGEMENT FOR OCCUPANT PROTECTION IN VEHICLES

(75) Inventors: Hans von Holst, Djursholm (SE); Carl-Axel Höjer, Kungälv (SE); Peter Halldin, Stockholm (SE); Camilla Palmerz, Västra Frölunda (SE)

(73) Assignee: Volvo Personvagnar AB, Göteborg (SE)

( * ) Notice: Subject to any disclaimer, the term of this patent is extended or adjusted under 35 U.S.C. 154(b) by 0 days.

(21) Appl. No.: 09/681,734

(22) Filed: May 30, 2001

(65) Prior Publication Data
US 2001/0045762 A1 Nov. 29, 2001

Related U.S. Application Data

(63) Continuation of application No. PCT/SE99/02056, filed on Nov. 12, 1999.

(30) Foreign Application Priority Data

Nov. 30, 1998 (SE) ............................................. 9804143

(51) Int. Cl.⁷ .............................................. B06R 13/02
(52) U.S. Cl. ........................ 296/214; 280/748; 280/751
(58) Field of Search ................................ 296/189, 210, 296/214; 280/748, 751

(56) References Cited

U.S. PATENT DOCUMENTS

| 3,188,112 | A | | 6/1965 | Oelkrug |
| 5,082,716 | A | | 1/1992 | Satterfield et al. |
| 5,709,407 | A | | 1/1998 | Stephens et al. |
| 5,775,726 | A | | 7/1998 | Timothy et al. |
| 5,823,611 | A | | 10/1998 | Daniel et al. |
| 5,833,304 | A | * | 11/1998 | Daniel et al. ............... 280/751 |
| 6,234,526 | B1 | * | 5/2001 | Song et al. .................. 280/751 |
| 6,264,238 | B1 | * | 7/2001 | MacDonald et al. ........ 280/751 |

FOREIGN PATENT DOCUMENTS

| WO | WO 92/04210 A1 | 3/1992 |
| WO | WO 97/10950 A1 | 3/1997 |

* cited by examiner

Primary Examiner—D. Glenn Dayoan
Assistant Examiner—Jason Morrow
(74) Attorney, Agent, or Firm—Howrey Simon Arnold & White LLP

(57) ABSTRACT

Method and device for protecting a person (2) traveling in a vehicle (1) by applying a protective arrangement the inside of the roof (4) of the vehicle (1). The inside of the roof (4) is equipped with an inner roof structure (5) in a place where the head (3) of the person (2) traveling in the vehicle is expected to make an impact in the event of an accident. The inner roof structure (5) is designed to guide the head (3) so that a flexion of the neck (6) of the person (2) traveling in the vehicle is initiated essentially simultaneously with the impact between the head (3) and the inside of the roof (4) during the accident. The device gives an improved protection of a person traveling in a vehicle (1), especially against head and neck injuries that occur when a person's head hits the inside of the roof (4) of the vehicle (1).

18 Claims, 6 Drawing Sheets

ARRANGEMENT FOR OCCUPANT PROTECTION IN VEHICLES

CROSS REFERENCE TO RELATED APPLICATIONS

This is a continuation patent application of International Application Number PCT/SE99/02056 filed Nov. 12, 1999 and published in the English language under PCT Article 21(2), that designates the United States and is now abandoned. The full disclosure of said application, in its entirety, is hereby expressly incorporated by reference into the present application.

BACKGROUND OF INVENTION

1. Technical Field

The present invention relates to a device for the protection of a person traveling in a vehicle. In particular, the invention relates to a protective element that is fitted to the inside of the roof of a motor vehicle in order to prevent head and neck injuries to a person traveling in the vehicle in the case of certain types of accidents.

2. Prior Art

Many different arrangement are used in modern motor vehicles, such as automobiles, in order to protect the drivers and passengers in the event of a collision and other types of accidents. In addition to safety belts and air bags, which are based on well-tested technology, some more sophisticated systems have been developed in recent years, such as side air bags, to protect the driver and passengers in the event of lateral collisions.

Certain accidents involve a risk of persons in the vehicle hitting their heads on the inside of the roof. One example of such accidents is when the car overturns. Another example is when a vehicle traveling at high speed hits something on the road that protrudes a relatively great distance from the road surface or when the vehicle veers off into a ditch, for example. The result of this may be that the persons traveling in the vehicle hit their heads either on the inside of the roof or on the side portions of the roof frame, which are normally connected to the roof and run basically parallel to the longitudinal axis of the vehicle. In a bad accident, this can cause serious injuries to the head, neck or shoulder of the persons traveling in the vehicle. The situation is the same in the case of certain types of injuries sustained when diving into water, where severe head and neck injuries can occur from hitting a hard object below the surface of the water.

It is a known protective measure to provide an inflatable air bag that is arranged on the inside of the roof of the vehicle. This device is fitted for damping the force with which a person's head hits the inside of the roof. This device can reduce the risk of head and neck injuries to drivers and passengers. However, it should be pointed out that this device is a rather bulky and expensive solution.

SUMMARY OF INVENTION

The aim of the present invention is to provide an improved device for the protection of persons traveling in a vehicle in the event of an accident in which they hit their heads on the inside of the roof of the vehicle.

The invention relates to a method and device for the protection of persons traveling in a vehicle. In the structural embodiment, the device is fitted to the inside of the roof of the vehicle. The invention is characterized in that the part of the roof that is expected to come into contact with a person's head during an accident is equipped with an inner root structure that guides the head in such a way that a bending (flexion) of the neck is initiated essentially simultaneously with the impact between the head and the inside of the roof during the accident.

The invention is based on the fact that, according to recent medical experience relating to diving and ice hockey accidents, the effect of a compressive force against the vertex or crown of the head and acting axially on the head and through the neck, is less likely to cause serious injury in such an impact if the neck is bent at the same time. More specifically, it can be stated that the degree of neck injury depends on several factors including: the angle of impact, the distance from the vertex of the head (i.e., the point on the head where an imaginary extension of the neck would intersect the head), and the properties of the material where the impact takes place. It can be stated that the injury occurs most frequently and is most serious when the impact is basically vertical to the vertex of the head. It can also be stated that a compressive force acting on the head that results in the flexion of the head and neck gives the lowest frequency of neck injuries. It can therefore be concluded that a combined flexion and compression exerted on the head produce considerably less damage than a compressive force acting alone. In addition, in the case of such a combined flexion and compression, the neck absorbs more energy before damage occurs than in the case when only a compressive force is acting.

The aim of the invention is to provide a means or mechanism for guiding a person's head during an accident in such a way that a flexion of the neck is initiated essentially simultaneously with an axial impact between the head and the inside of the roof of the vehicle. According to the invention, the flexion of the neck is mainly initiated forwards (in relation to the longitudinal direction of the vehicle) or sideways.

The invention provides several advantages. First of all, it considerably reduces the risk of serious head or neck injuries to persons traveling in a vehicle. More specifically, it significantly reduces the neck component of the force measured at the occipital point, where the base of the skull is joined to the uppermost cervical vertebra. This in turn reduces the risk of serious head and neck injuries.

In a preferred embodiment of the present invention, the inside of the roof is fitted with a first layer of material, which is essentially rigid, and a second layer of material, which absorbs energy, as a result of which a flexion of the person's neck is initiated during an impact involving the head. The fact that the second layer of material absorbs energy has the advantage that it can absorb a large part of the energy that is released when a person's head hits the roof.

BRIEF DESCRIPTION OF DRAWINGS

The invention is explained in more detail with reference to a preferred embodiment and the figures, in which.

DETAILED DESCRIPTION

Figure 1:
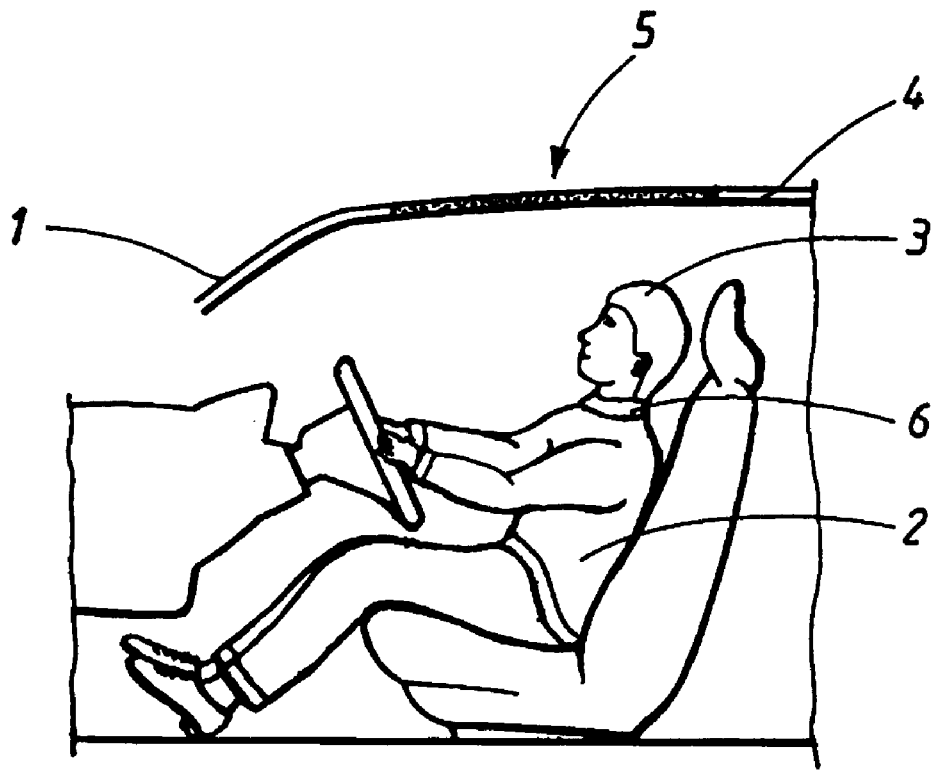
FIG. 1 is a diagrammatic side elevational view showing the main function of the invention.

Referring to the figures, FIG. 1 shows a simplified side view of a vehicle fitted with a device configured according to the present invention. In a preferred embodiment, the device is used in a vehicle 1 such as a car or automobile. FIG. 1 shows a driver 2 sitting in the driving seat of the vehicle 1. As usual, the driver 2 is sitting, while driving, in such a way that his or her head 3 is at a certain distance from the inside of the roof 4 of the car 1. In this context, the term "inside of the roof" is intended to comprise or include the whole roof construction, including the side portions of the roof frame, though not shown, but which normally run basically in the longitudinal direction of the vehicle 1.

As previously mentioned, in certain types of accident, such as, for example, a roll-over situation, when the vehicle rotates around its longitudinal axis, there is a risk that the head 3 of the driver 2 will be pushed against the inside of the roof 4 with great force. In a serious accident, this can cause damage to the driver's head and neck if the head 3 of the driver 2 hits the roof 4 with great force.

Figure 2:
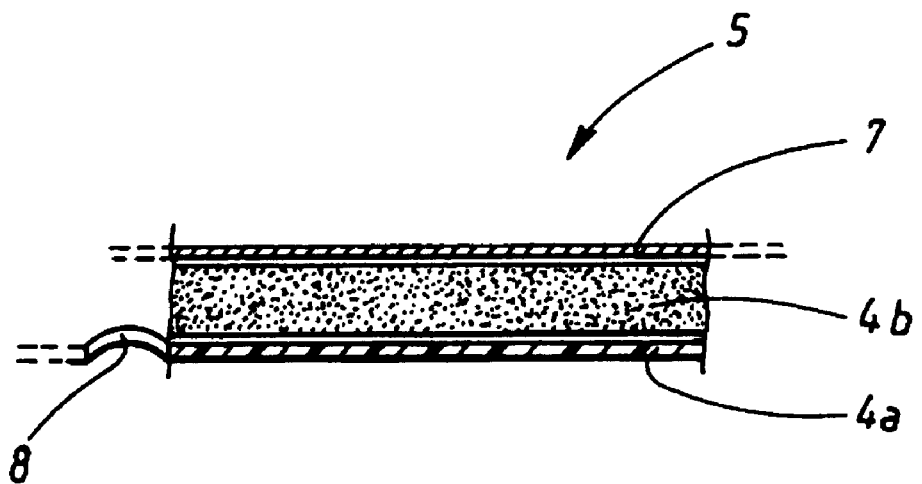
FIG. 2 is a cross section of the inner roof construction according to the invention.

One of the fundamental principles behind the present invention is that the inside of the roof 4 includes a structure 5 that is specially designed to guide the head 3 of the driver 2 under the abovementioned accident conditions in such a way that a flexion of the neck 6 of the driver 2 is initiated at the same time as his or her head 3 hits the inside of the inside of roof 4. For this purpose, the device is designed in a first embodiment so that the inside of the roof is equipped with a structure 5 consisting of a first layer of material, which is nearest the head 3 of the driver 2 and which is made of a relatively hard and rigid material. A second layer of material lies above the first layer and is made of an energy-absorbing and elastic material. This embodiment is illustrated in greater detail in FIG. 2, which is a somewhat enlarged partial view of the inside of the roof 4. The first layer 4a consists of a protective and impact-absorbing material that is relatively rigid and can therefore prevent the driver's head from being pressed into the inside of the roof during an accident of the type in question.

It should be noted that, although FIG. 1 shows only the driver 2 of the vehicle fitted with a device according to the invention, this device can be used for protecting all persons traveling in a car 1, depending on which parts of the inside of the roof 4 are accordingly equipped.

In a typical application in a car 1, the first layer 4a is about 2–3 mm thick and consists of a hard plastic, a composite material, or a material with similar properties. The second layer 4b consists of an energy-absorbing material fitted to absorb the energy released in the impact of the head 3 of the driver 2 in an accident of the type in question. More specifically, the second layer of material 4b is intended to be compressible by about 20–40 mm, and preferably by about 25 mm in the axial direction; that is, along an imaginary line that runs basically along the spine and neck 6 of a person traveling in the vehicle 1.

Above the second layer of material 4b lies the vehicle's roof proper 7, which is typically made of pressed steel plate. In this embodiment, the second layer of material 4b is firmly fixed to the roof 7 so that it cannot be displaced with respect to the latter.

In the event that the head 3 of the driver 2 is involved in an impact in the axial direction; that is, along the imaginary line running through the spine and neck 6 of the driver 2, a flexion of the neck 6 is initiated essentially simultaneously with the occurrence of the axial force being exerted on the head 3. For this purpose, the first layer of material 4a is made sufficiently rigid to prevent the head 3 from being pressed firmly and being "locked" against movement; for example, in the longitudinal direction of the vehicle, and instead, allows the neck 6 to bend. The energy-absorbing second layer 4b, on the other hand, ensures that the first layer 4a can be displaced somewhat so that the driver's head is displaced to the same extent.

As described later in greater detail, the two layers 4a and 4b are preferably arranged in such away that displacement occurs in the longitudinal direction of the vehicle, but displacement in a direction that is different from the longitudinal direction of the vehicle is also possible.

To permit the displacement of the first layer 4a, and also to initiate flexion of the driver's neck, the first layer 4a is fitted in an inner roof structure 5 with a suitable connector or means of connection 8 that allows a relative movement of the first layer 4a in relation to the inner roof structure 5.

Figure 3:
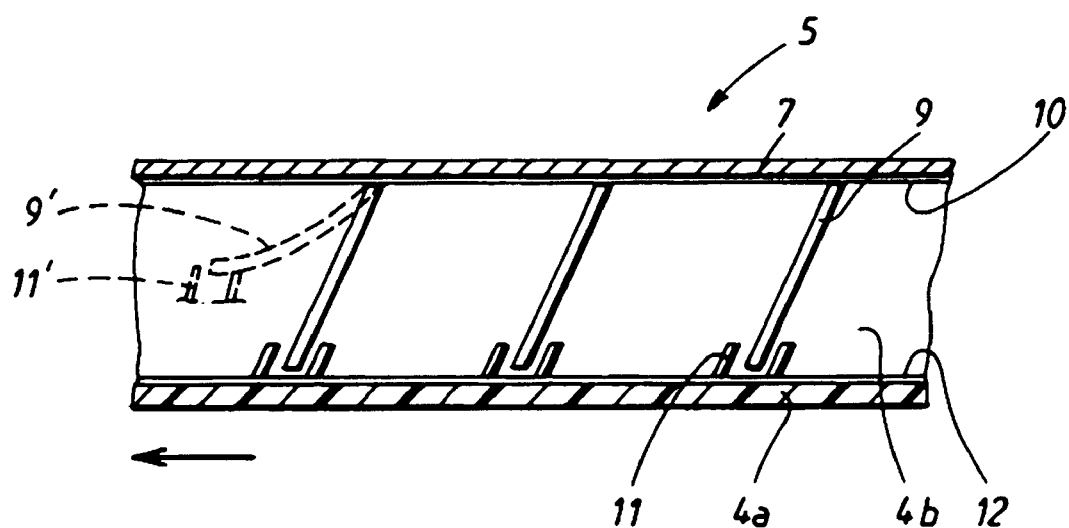
FIG. 3 is a cross section showing the structure according to the invention slightly enlarged compared to FIG. 2.

FIG. 3 shows the construction of the device according to the first embodiment of the invention in greater detail. More specifically, it shows that the second layer 4b consists of a number of strip-like and/or rod-like elements 9 that extend essentially transversely to the direction in which the driver's head is to be guided. In one embodiment, the strips 9 are arranged essentially at right angles to the longitudinal direction of the vehicle. Furthermore, the strips 9 are inserted into an upper fixing layer 10 and lie at an oblique angle to that layer 10. The strips 9 are angled backwards in relation to the front of the vehicle as is indicated by the arrow in FIG. 3.

The lower part of the strips 9 is fixed with a clip 11 or a similar component in which the lower part of each strip 9 can move. The clips 11 are each firmly connected to a bottom fixing layer 12 that forms part of the second layer of material 4b, as does also the top fixing layer 10. In this way, the strips 9 are firmly held in the normal state; that is, when no force is acting on them. Alternatively, the strips 9 can be fixed to the second layer 4b in a different way, for example by casting them securely both with the top fixing layer 10 and with the bottom fixing layer 12.

To ensure an energy-absorbing effect in the second layer 4b, the strips 9 are made of an elastic, plastic or other similar flexible material.

The broken lines in FIG. 3 show how a strip 9' bends as it absorbs energy, which happens when it comes into contact with the first layer 4a. The strips 9 are deflected upwards to assume a higher position, indicated by 9', because of the arrangement of the clips 11, 11'. In the event of such contact, which can come about in accidents of the types previously described, the first layer 4a is subjected to a compressive force, which is then transferred to the second layer 4b. Since the strips 9 are angled, the first layer 4a is guided so that it is displaced by a certain distance in the direction indicated by the arrow in FIG. 3 as the strips 9 bend. This normally means in the direction toward the front of the vehicle. The invention, however, is not limited to a movement in this direction, but can permit a relative displacement in principle in any direction, depending on the orientation of the strips 9. As a result, the head of the person in question is guided so that his or her neck is bent to some extent, simultaneously with the action of an axial force. This reduces the risk of serious head and neck injuries in accidents causing head contact with the vehicle's interior roof.

In this way, the invention is based on equipping the inside of the roof 4 with an inner roof structure 5 that includes a guiding element in the form of two layers 4a and 4b, placed essentially directly above the head 3 of the person 2; that is, where an impact can be expected in the event of an accident. These layers are sufficiently rigid to permit a flexion of the person's neck 6 in the event of an impact. The layers of material also have energy-absorbing properties, in order to permit the flexion of the neck 6 of the person 2 to be initiated essentially simultaneously with the impact between the head 3 and the inside of the roof 4.

Figure 4:
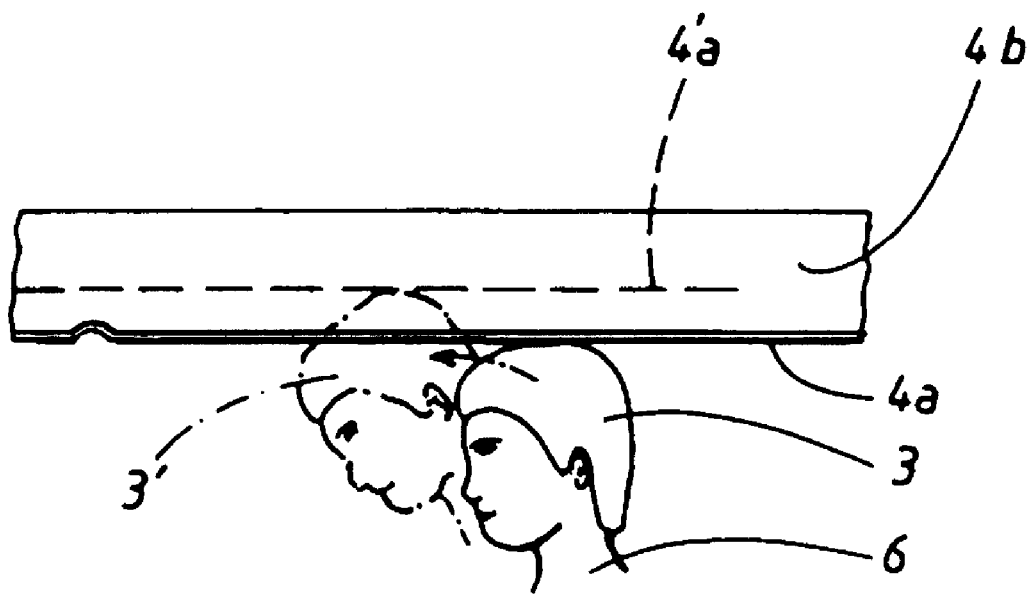
FIG. 4 is diagrammatic side elevational view showing the function of the invention.

FIG. 4 shows the principle of the displacement of a person's head 3 according to the present invention. When the person's head 3 experiences an impact, the first layer 4a is initially acted on in the axial direction, such as in the direction defined by an imaginary line through the person's head and neck. At essentially the same time, the first layer 4a begins to be displaced in the direction in which its displacement is allowed by the structure of the second layer 4b as is described in connection with FIG. 3. In the embodiment illustrated, the first layer 4a is displaced somewhat towards the front of the vehicle 1. At the same time, energy is absorbed by the second layer 4b. As illustrated by the broken lines, this results in a displacement of the person's head 3' across a certain distance. At this stage, the first layer 4'a is also displaced a certain distance forwards. The device, mechanism or means configured according to the present invention is preferably arranged so that it permits a displacement of the first layer 4a, 4'a through a distance of the order of magnitude of 50 mm.

Figure 5:
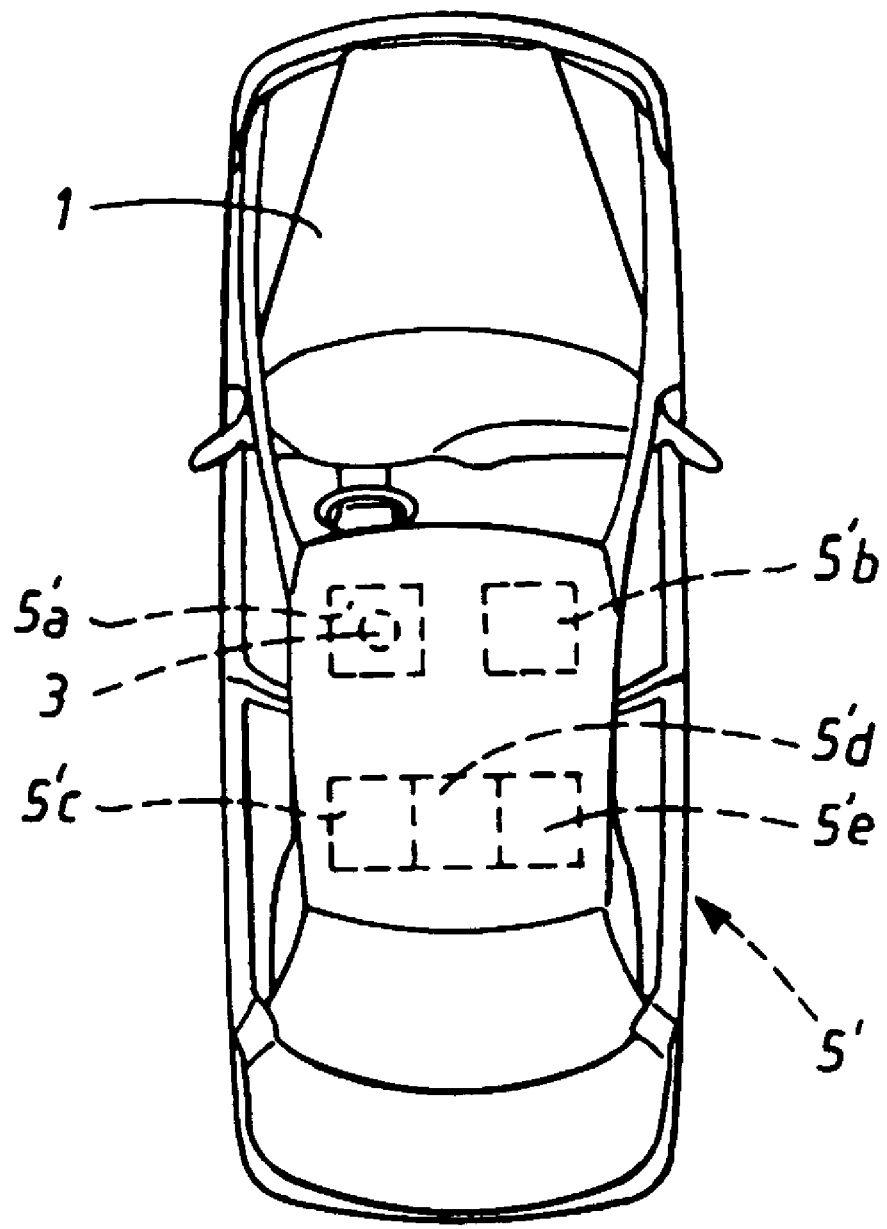
FIG. 5 is a simplified plan view showing a vehicle fitted with a number of protective elements according to the invention.

In accordance with the present invention, the inner roof structure may be designed as a separate protective element that is fitted to the inside of the roof of a vehicle in a position where a person's head is expected to hit the roof in the event of an accident or other incident causing behavior as described hereinabove. This principle is described with reference to FIG. 5, which shows a view from above of a vehicle 1 in which according to the invention can be used. In particular, the inner roof structure 5' can be designed with a number of such protective elements 5'a, 5'b, 5'c, 5'd and 5'e, which are then positioned in areas corresponding to the places where the persons traveling in the vehicle are expected to sit. Thus, the figure shows the first protective element 5'a intended for the driver of the vehicle 1, a second protective element 5'b intended for a passenger sitting next to the driver of the vehicle 1, and three other protective element 5'c, 5'd and 5'e intended for passengers sitting in the back of the vehicle 1. The first protective element 5'a, for example, is intended to protect the driver from an impact of his or her head 3 against the inside of the roof.

The invention is not limited to the use of these protective elements 5' in any particular number in the vehicle 1, but instead these elements can be fitted optionally for example over two, four or five seats for persons traveling in the vehicle 1.

Figure 6:
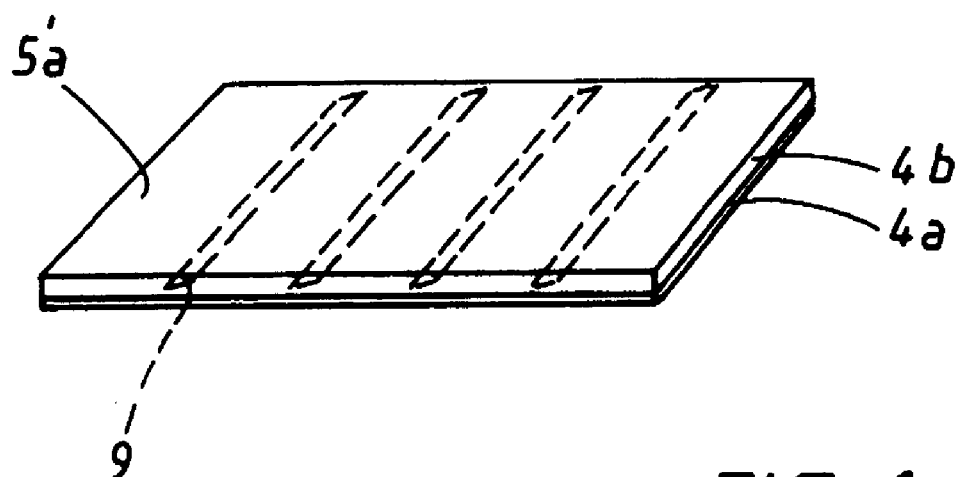
FIG. 6 is a perspective view showing a protective element configured according to the invention.

FIG. 6 shows a perspective view of a protective element 5' according to the invention that is designed so that it can be fitted to an existing roof of a vehicle. The figure shows a number of strips 9 which correspond to the strips illustrated in FIG. 3.

In an alternative embodiment of the invention which is not shown in the figures, the inner roof structure can be designed with a single layer of material, whose surface nearest the person traveling in the vehicle has very low friction. This layer is also relatively rigid, so that it prevents the person's head from being "locked" against the roof, which could happen if the layer of material bent inwards. Instead, this alternative embodiment allows and encourages the head to slide on the surface of the layer of material, so that the neck is bent on the impact of the head, due to the low friction. As a result, the aim of the invention is achieved in this alternative as well; that is, the head is guided forward and the neck is flexed substantially simultaneously with the impact between the head and the inside of the roof in an accident of the type being considered.

The invention is not limited to the embodiments described above and illustrated in the figures, but can be modified within the scope of the following claims. For example, the invention can be used with various kinds of vehicles such as cars and lorries.

The invention is not limited in principle to the use in conjunction with a roof, but permits its use on any surface on which a person can hit his or her head in a vehicle. For example, the device according to the invention can be used on the side portions of the roof frame and other vertical or horizontal surfaces.

In addition, the invention is not limited to the initiation of a flexion of a person's neck in the longitudinal direction of the vehicle; that is, in the direction of the front of the vehicle. Such a flexion of the neck can also be brought about in a sideways or backward direction.

What is claimed is:

1. An arrangement for the protection of a person traveling in a vehicle, and which is fitted to the inside of the roof of the vehicle, the arrangement comprising:

an inner roof structure as part of the inside of the roof in a place where the head of the person traveling in the vehicle is expected to make an impact in the event of an accident, the inner roof structure further comprising an outer layer of a rigid material and a second layer of an energy absorbing material, wherein the inner roof structure is designed to guide the head forward so that a flexion of the neck of the person traveling in the vehicle is initiated substantially simultaneously with the impact between the head and the inside of the roof during the accident, the arrangement being substantially parallel to the roof of the vehicle.

2. The arrangement according to claim 1, said inner roof structure further comprising a first layer of material that is substantially rigid upon impact, and a second layer of material for absorbing energy and guiding the movement of the head during the flexion of the neck, wherein said first layer is nearest the person traveling in the vehicle relative to said second layer.

3. The arrangement according to claim 2, wherein the second layer of material is designed to guide the head forward in relation to the longitudinal direction of the vehicle.

4. The arrangement according to claim 2, wherein the second layer of material is designed to guide the head sideways in relation to the longitudinal direction of the vehicle.

5. The arrangement according to claim 2, wherein the second layer of material further comprises a number of elastic strip-like elements extending substantially transversely to the direction in which the head is guided during the flexion of the neck.

6. The arrangement according to claim 5, wherein the strip-like elements in the second layer of material are somewhat oblique with respect to the vertical direction when no forces are acting on them, and an impact that may occur leads to a displacement of the first layer of material in relation to the second layer of material.

7. The arrangement according to claim 1, wherein the inner roof structure comprises a layer of material that has very low friction and is situated nearest the person.

8. A protective element to be fitted to the inside of the roof of a vehicle for protecting a person in the vehicle, the protective element comprising energy-absorbing and guiding components for initiating a forward flexion of the neck of the person essentially simultaneously with an impact between the head and the inside of the roof in an accident in which the head of the person traveling in the vehicle hits the inside of the roof.

9. A method for reducing injury to a passenger of a vehicle when contact is made between the passenger and an interior portion of the vehicle, said method comprising:

providing a deflecting arrangement on an interior portion of a vehicle, said interior portion being susceptible to being struck by a riding passenger under accident conditions; and configuring said deflecting arrangement to deflect a portion of a passenger upon impact with said deflecting arrangement and simultaneously redirecting and controlling motion of that portion of the passenger from an original direction of impact to a direction less likely to cause injury to the passenger, wherein the redirecting and controlling motion takes place continuously while the passenger is in contact with the arrangement.

10. The method according to claim 9, further comprising:

constructing an exposed surface of said deflecting arrangement from low-friction material.

11. The method according to claim 9, further comprising:

positioning said deflecting arrangement on an interior portion of a roof structure of the vehicle at a location of expected impact by a passenger's head under accident conditions.

12. The method according to claim 11, further comprising:

configuring said deflecting arrangement to controllably bend an impacting passenger's head forward thereby minimizing the likelihood of injury to the passenger.

13. The method according to claim 12, further comprising:

constructing said deflecting arrangement to include a plurality of deformable strip-like elements.

14. The method according to claim 13, further comprising:

configuring said deformable strip-like elements into a series of substantially equally spaced deformable strip-like elements and each of said deformable strip-like elements having a fixed end and a free end.

15. The method according to claim 14, further comprising:

arranging said fixed end of each of said deformable strip-like elements to be closer to a rear end of the vehicle than said respective free end.

16. An arrangement fitted to the roof of a vehicle for the protection of a person traveling in the vehicle, said arrangement comprising:

an inner roof structure in a place where the head of the person traveling in the vehicle is expected to make an impact in the event of an accident, said inner roof structure further comprising an outer layer of a rigid and a second layer of an energy absorbing material, wherein said inner roof structure is designed to guide the head forward so that a flexion of the neck of the person traveling in the vehicle is initiated substantially simultaneously with the impact between the head and the inside of the roof during the accident, and wherein said arrangement is substantially parallel to said roof of the vehicle.

17. An arrangement fitted to the inside of the roof of the vehicle for the protection of a person traveling in a vehicle, said arrangement comprising:

an inner roof structure in a place where the head of the person traveling in the vehicle is expected to make an impact in the event of an accident, wherein said inner roof structure is designed to guide the head so that a flexion of the neck of the person traveling in the vehicle is initiated substantially simultaneously with the impact between the head and the inside of the roof during the accident, said inner roof structure further comprising a first layer of material that is substantially rigid upon impact, and a second layer of material for absorbing energy and guiding the movement of the head during the flexion of the neck, said second layer comprising one or more elastic strip-like elements extending substantially transversely to the direction in which the head is guided during the flexion of the neck, and wherein said first layer is nearest the person traveling in the vehicle relative to said second layer.

18. A method for reducing injury to a passenger of a vehicle when contact is made between the passenger and an interior portion of the vehicle, said method comprising:

providing a deflecting arrangement on an interior portion of a vehicle, said interior portion being susceptible to being struck by a riding passenger under accident conditions;

configuring said deflecting arrangement to deflect a portion of a passenger upon impact with said deflecting arrangement and redirecting and controlling motion of that portion of the passenger from an original direction of impact to a direction less likely to cause injury to the passenger;

positioning said deflecting arrangement on an interior portion of a roof structure of the vehicle at a location of expected impact by a passenger's head under accident conditions;

configuring said deflecting arrangement to controllably bend an impacting passenger's head forward thereby minimizing the likelihood of injury to the passenger; and constructing said deflecting arrangement to include a plurality of deformable strip-like elements.

* * * * *